United States Patent
Ogino

(10) Patent No.: US 9,501,434 B2
(45) Date of Patent: Nov. 22, 2016

(54) MICROCOMPUTER

(71) Applicant: DENSO CORPORATION, Kariya, Aichi-pref. (JP)

(72) Inventor: Tetsuya Ogino, Nagoya (JP)

(73) Assignee: DENSO CORPORATION, Kariya (JP)

( * ) Notice: Subject to any disclaimer, the term of this patent is extended or adjusted under 35 U.S.C. 154(b) by 889 days.

(21) Appl. No.: 13/860,945

(22) Filed: Apr. 11, 2013

(65) Prior Publication Data

US 2013/0290587 A1    Oct. 31, 2013

(30) Foreign Application Priority Data

Apr. 27, 2012    (JP) .................................. 2012-102250

(51) Int. Cl.
*G06F 13/24*    (2006.01)
(52) U.S. Cl.
CPC ..................................... *G06F 13/24* (2013.01)
(58) Field of Classification Search
USPC .................. 710/260, 265, 266, 269; 701/115
See application file for complete search history.

(56) References Cited

U.S. PATENT DOCUMENTS

| | | | |
|---|---|---|---|
| 6,285,948 B1 * | 9/2001 | Takagi et al. .................. | 701/115 |
| 7,068,147 B2 * | 6/2006 | Suganuma et al. ........... | 340/5.74 |
| 7,269,678 B2 * | 9/2007 | Nishimura ..................... | 710/260 |
| 8,565,962 B2 * | 10/2013 | Yoshiyama ................... | 701/33.1 |
| 2002/0144053 A1 * | 10/2002 | Yada et al. ..................... | 711/103 |
| 2005/0122777 A1 * | 6/2005 | Yada et al. ............... | 365/185.11 |
| 2005/0216635 A1 * | 9/2005 | Nishimura ..................... | 710/260 |
| 2006/0161314 A1 | 7/2006 | Honmura | |
| 2007/0083745 A1 * | 4/2007 | Iwata ................................ | 713/1 |

FOREIGN PATENT DOCUMENTS

| | | |
|---|---|---|
| JP | 2001-188683 | 7/2001 |
| JP | 2002-24043 | 1/2002 |
| JP | 2004-318403 | 11/2004 |
| JP | 2005-228225 | 8/2005 |
| JP | 2005-332228 | 12/2005 |

OTHER PUBLICATIONS

English Translation of JP 2004-318403.*
Office Action (3 pages) dated Apr. 15, 2014, issued in corresponding Japanese Application No. 2012-102250 and English translation (5 pages).

* cited by examiner

*Primary Examiner* — Khanh Dang
(74) *Attorney, Agent, or Firm* — Nixon & Vanderhye P.C.

(57) ABSTRACT

A rewriting area of a flash ROM stores a main program, which includes a user vector with respect to each of interrupt factors that are different from each other in respect of types. The user vector with respect to a subject interrupt factor indicates an address, which stores an interrupt processing program that is executed when the subject interrupt factor arises. This user vector is stored in a predetermined address dedicated for the subject interrupt factor. The predetermined address of the user vector is enabled to be specified by an interrupt vector or interrupt changeover program, both of which are stored in a non-rewriting area of the flash ROM. Even when an address of the interrupt processing program is changed, the changed address is enabled to be indicated by using the user vector.

6 Claims, 6 Drawing Sheets

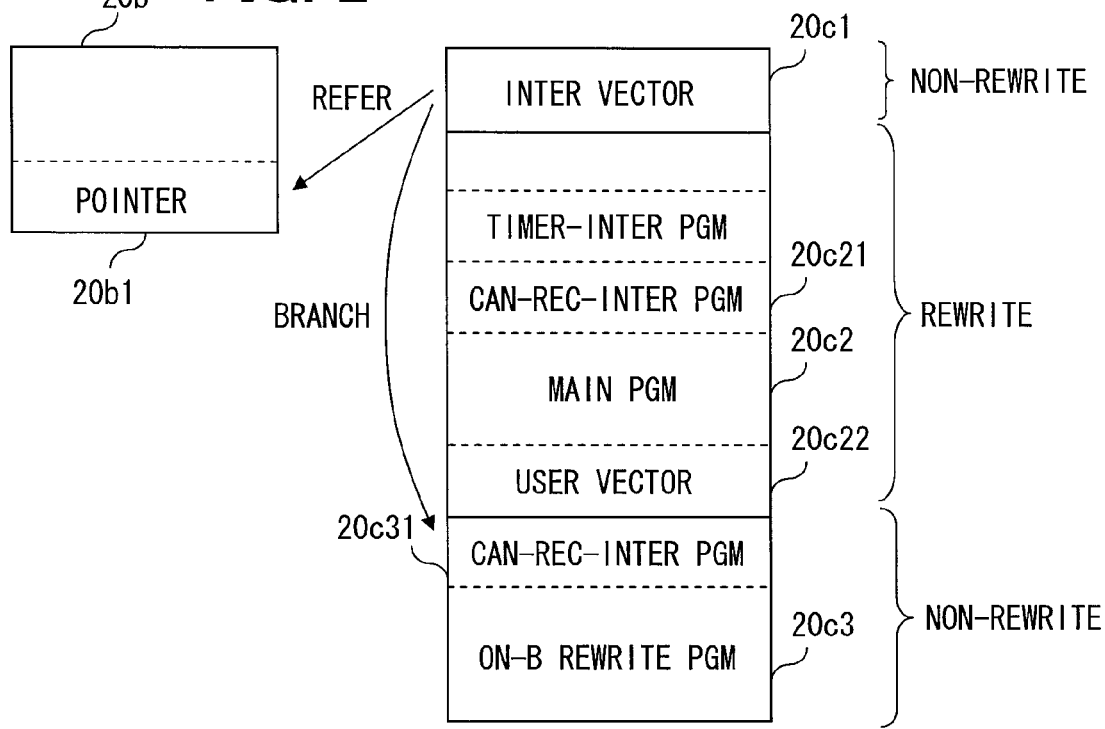
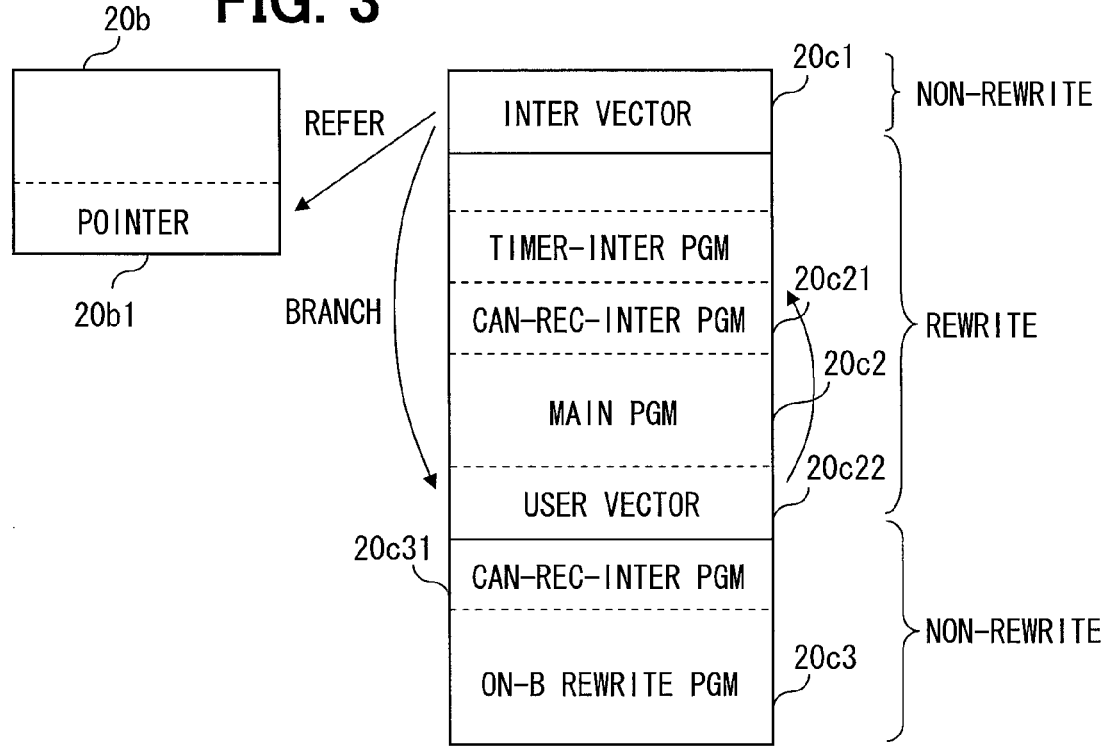

| INTER FACTORS | POINTERS |
|---|---|
| SW EXCEPTION | VARIABLE |
| CAN REC | ↑ |
| CAN TRANS | ↑ |
| TIMER0 MATCH | ↑ |
| TIMER1 MATCH | ↑ |
| EXT SIGNAL IN 1 | FIXED (ADDRESS OF USER VECTOR) |
| EXT SIGNAL IN 2 | ↑ |
| .. | .. |

FIG. 9

| TYPES | EXCEPT CODE | ADDRESSES OF INTER VECTOR | OCCURRENCE |
|---|---|---|---|
| RESET | 0000H | 00000000H | AT RESET INPUT |
| SW EXCEPT | 0010H | 00000010H | AT TRAP INSTRUCT |
| CAN REC | 0020H | 00000020H | AT REC COMPLETE |
| CAN TRANS | 0030H | 00000030H | AT TRANS COMPLETE |
| TIMER0 MATCH | 0040H | 00000040H | AT TIMER0 MATCH |
| TIMER1 MATCH | 0050H | 00000050H | AT TIMER1 MATCH |
| EXT SIGNAL IN 1 | 0060H | 00000060H | AT SIGNAL1 INPUT |
| EXT SIGNAL IN 2 | 0070H | 00000070H | AT SIGNAL2 INPUT |
| : | : | : | : |

FIG. 10

| TYPES | ADDRESSES OF USER VECTOR | DESCRIPTION |
|---|---|---|
| RESET | 00010000H | BRANCH TO MAIN FUNC |
| SW EXCEPT | 00010010H | RETURN FROM INTER |
| CAN REC | 00010020H | BRANCH TO CAN_REC FUNC |
| CAN TRANS | 00010030H | RETURN FROM INTER |
| TIMER0 MATCH | 00010040H | RETURN FROM INTER |
| TIMER1 MATCH | 00010050H | RETURN FROM INTER |
| : | : | : |

MICROCOMPUTER

CROSS REFERENCE TO RELATED APPLICATION

The present application is based on Japanese Patent Application No. 2012-102250 filed on Apr. 27, 2012, the disclosure of which is incorporated herein by reference.

TECHNICAL FIELD

The present disclosure relates to a microcomputer including a rewritable nonvolatile memory storing a main program, the microcomputer performing onboard rewriting of the main program stored in the nonvolatile memory.

BACKGROUND ART

[Patent Literature 1] JP 2005-228225 A
[Patent Literature 2] JP 2002-24043 A

For example, Patent Literature 1 discloses a technology, which avoids a system break-down due to a failure in update of firmware in a memory card adapter containing a rewritable flash memory. Specifically, a flash memory additionally includes a non-rewriting area which stores a program that permits minimum operation even when the firmware update under the onboard state is unsuccessful. Further, the non-rewriting area is additionally provided with a function to determine success or failure of the result of the firmware update. At a restart after completing the firmware update, the processing jumps to the non-rewriting area by an interrupt vector function, thereby activating an update result determination means that is stored in the non-rewriting area for determining the success or failure of the result of the firmware update. When the result is successful, the processing jumps to the start address of the main program, starting an operation by the new firmware. In contrast, when the result is unsuccessful, the firmware is updated again.

Further, Patent Literature 2 discloses a microcomputer, which enables the rewriting of an interrupt vector table even when adopting onboard rewriting of a flash memory, eliminating the restrictions on development of a user program. To that end, an address control circuit is additionally provided in between the CPU and the flash memory in order to provide the flash memory with an alternative reset vector address which specifies a storage position of the start address of a rewrite control program, by replacing a reset vector address that is outputted from the CPU so as to specify the start of the vector table. This configuration can start an execution of the rewrite control program using indirect addressing based on the alternative reset vector address outputted from the address control circuit, thereby rewriting the vector table along with a user program.

In the technology of Patent Literature 1 the interrupt vector function is not erased at the time of the firmware update; thus, the program stored in the non-rewriting area can be executed using the interrupt vector function even after the firmware update. This configuration cannot change the contents of the interrupt vector function, unfortunately. Therefore, an assigned address of an interrupt processing program specified by the interrupt vector function cannot be changed as needed even at the time of upgrading the version of the main program.

In contrast, the technology in Patent Literature 2 can rewrite the vector table along with the user program (i.e., main program), enabling the change of the assigned address of an interrupt processing program as needed. Adopting the indirect vector addressing using such a vector table can reduce the data size of the whole program, providing an advantage.

However, the technology of Patent Literature 2 provides the above-mentioned address control circuit in between the CPU and flash memory for outputting an alternative reset vector address. Providing such a dedicated circuit for outputting the reset vector address, instead of a vector table, complicates the circuit configuration of the microcomputer, increasing costs.

SUMMARY

It is an object of the present disclosure to provide a microcomputer that is permitted to change assignment of an address of an interrupt processing program without complicating a circuit.

To achieve the above object, as an aspect of the present disclosure, a microcomputer is provided to include a CPU and a nonvolatile memory. The CPU executes selectively (i) a main program and (ii) an onboard rewriting program that executes an onboard rewriting of the main program. The nonvolatile memory includes (i) a rewriting permitted area where data are enabled to be rewritten and (ii) a rewriting forbidden area where data are forbidden from being rewritten. The rewriting permitted area stores the main program, while the rewriting forbidden area stores the onboard rewriting program. The rewriting forbidden area further stores an interrupt vector with respect to each of a plurality of interrupt factors, the interrupt factors being different from each other. The interrupt vector indicates an address of a branch destination when each of the plurality of interrupt factors arises. The microcomputer further includes a change section that uses the address indicated by the interrupt vector and changes a CPU-accessed address, which is an address accessed by the CPU, into either an address within the main program or an address within the onboard rewriting program according to the main program or the onboard rewriting program, whichever is executed. Herein: the main program includes a user vector stored in a predetermined address that is predetermined with respect to each of the plurality of interrupt factors; the user vector indicates an address which stores an interrupt processing program that is executed when each of the plurality of interrupt factors arises. Further, the change section specifies the predetermined address storing the user vector when changing the CPU-accessed address into the address within the main program.

Thus, under the above microcomputer aspect, the interrupt vector and the onboard rewriting program are stored in the rewriting forbidden area (i.e., non-rewriting area); thereby, the contents of the interrupt vector are preserved even when the rewriting of the main program is unsuccessful. This permits activation of the onboard rewriting program using the interrupt vector when executing the rewriting again. Thus, the above configuration prevents the occurrence of the event that disables the restart of the microcomputer, enabling the re-execution of the rewriting of the main program.

Further, the above microcomputer aspect provides the change section that changes the address accessed by the CPU into the address in the main program or the address in the onboard rewriting program depending on the main program or the onboard rewriting program, whichever is under execution by using the address indicated by the interrupt vector. The change section permits the indirect addressing using the above interrupt vector at the time of executing each of the main program and the onboard rewriting program, reducing the program size.

Yet further, the above microcomputer aspect provides a user vector which the main program uses for indicating an address storing an interrupt processing program corresponding to each of interrupt factors. The user vector corresponding to a subject interrupt factor is stored in a predetermined address dedicated for the subject interrupt factor in a storage area of the main program. Suppose that an address accessed by the CPU is changed into an address in the main program. In such a case, indicating an address storing the user vector corresponding to the subject interrupt factor permits an execution of an interrupt processing program corresponding to the subject interrupt factor. In addition, the user vector is stored in the main program. When changing the address assignment of the interrupt processing program at the time of revising the main program, the contents of the user vector may be changed in conjunction with the changed address assignment. Therefore, the above microcomputer aspect permits the change of the address assignment of the interrupt processing program as needed in the main program.

BRIEF DESCRIPTION OF THE DRAWINGS

The above and other objects, features, and advantages of the present disclosure will become more apparent from the following detailed description made with reference to the accompanying drawings. In the drawings:

FIG. 2 is a diagram for explaining a branch of processing when a CAN reception occurs as an interrupt factor during execution of an onboard rewriting program;

FIG. 3 is a diagram for explaining a branch of processing when a CAN reception arises as an interrupt factor during execution of a main program;

FIG. 9 is a diagram illustrating exception codes, addresses of interrupt vectors, and occurrence factors with respect to types of interrupt factors; and FIG. 10 is a diagram illustrating addresses and descriptions of user vectors with respect to types of interrupt factors.

DETAILED DESCRIPTION

First Embodiment

A microcomputer according to a first embodiment of the present disclosure is explained with reference to drawings. The present embodiment explains an example where the microcomputer is applied to a computer mounted in a vehicle for controlling an engine of the vehicle. However, there is no need to be limited to the computer controlling an engine; it can be applied also to a computer for another intended use.

Figure 1:
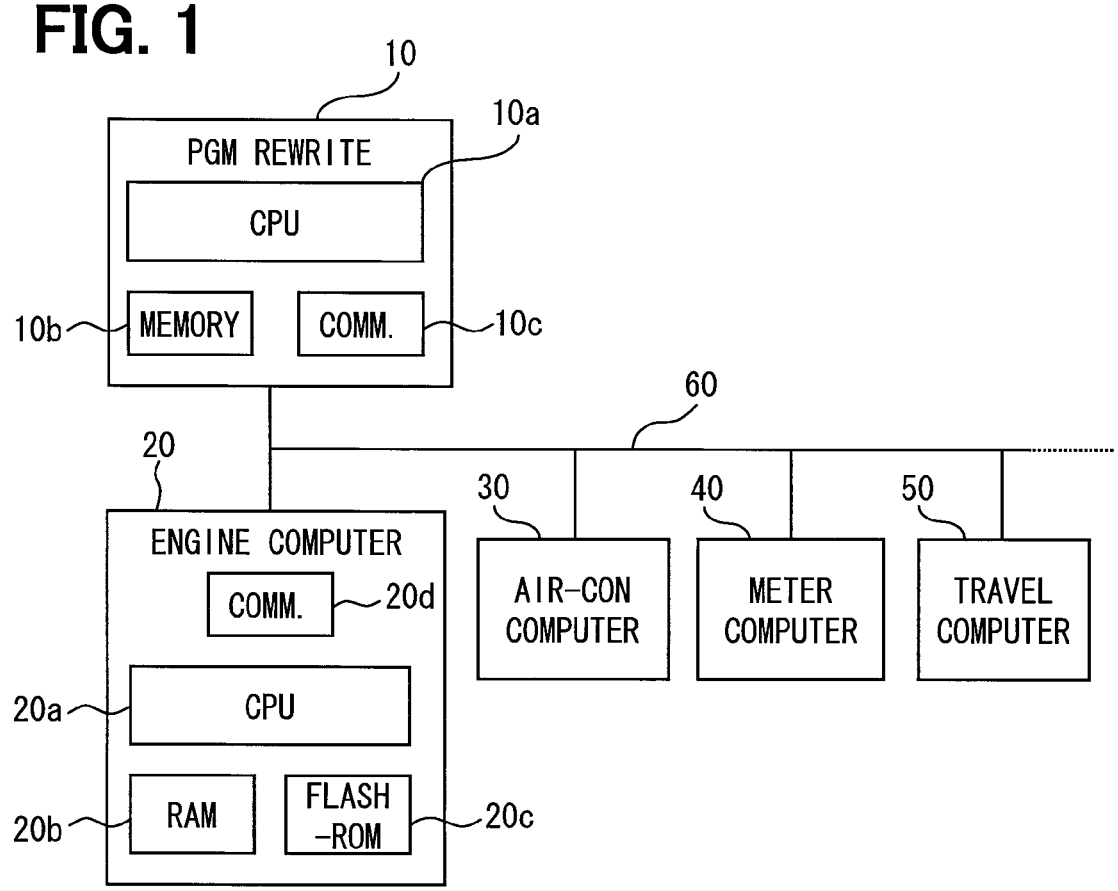
FIG. 1 is a diagram illustrating an overall configuration of a vehicular control system including an engine control computer according to a first embodiment of the present disclosure.

FIG. 1 illustrates a configuration of a vehicle control system including an engine control computer 20 according to the present embodiment. The vehicle control system includes multiple control computers to control various kinds of in-vehicle instruments such as an engine, air-conditioner, and meter, all of which communicate with each other via a communication network so as to share data and perform coordination control.

Specifically, the vehicle control system includes an engine control computer 20, an air-conditioner control computer 30, a meter control computer 40, and a travel control computer 50. Those computers 20, 30, 40, 50 communicate with each other via an in-vehicle LAN (Local Area Network) 60, which uses communication protocols such as CAN (Controller Area Network) protocols.

The engine control computer 20 includes a CPU 20$a$ which performs various kinds of data processing according to a main program for controls; a RAM 20$b$ which temporarily stores results of arithmetic processing by the CPU 20$a$, for instance; a flash ROM (or flash EEPROM) 20$c$ being a nonvolatile memory, which a main program 20$c$2 for controls is written in and stores the written main program 20$c$2; and a communication portion 20$d$ which communicates with other control computers.

The engine control computer 20 further includes an input circuit which inputs sensor information from various sensors which detect an engine operating state; and an output circuit which outputs drive signals which drive actuators attached to the engine, such as an injector and igniter.

Thus, the engine control computer 20 generates drive signals based on sensor information inputted from the input circuit according to the main program 20$c$2 stored in the flash ROM 20$c$, and outputs the generated drive signals to actuators, enabling the proper control of the operating state of the engine.

The flash ROM 20$c$ of the engine control computer 20 includes (i) a rewriting area (i.e., rewriting permitted area) in which stored data are electrically rewritable (erased and written); and (ii) a non-rewriting area (i.e., rewriting forbidden area) in which rewriting of the data is forbidden. The main program 20$c$2 is written and stored in the rewriting area of the flash ROM 20$c$. In addition, the non-rewriting area of the flash ROM 20$c$ stores an onboard rewriting program 20$c$3 for onboard rewriting of the main program 20$c$2. This onboard rewriting signifies a rewriting of the main program 20$c$2 in a vehicle-mounted state where the engine control computer 20 is mounted in the vehicle using an update program provided from a program rewriting apparatus 10 connected to the in-vehicle LAN 60 via wired links or wireless links.

Furthermore, the non-rewriting area of the flash ROM 20$c$ stores interrupt vectors 20$c$1 (also referred to as an interrupt vector table). The interrupt vectors are provided for each of interrupt factors that are different from each other in types. When a subject interrupt factor arises, the interrupt vector 20$c$1 with respect to the subject interrupt factor refers to a pointer 20$b$1 assigned to the subject interrupt factor in the RAM 20$b$ and indicates an address (i.e., CPU-accessed address) of a branching destination which the CPU 20$a$ should access. That is, the interrupt vector 20$c$1 describes a branch instruction to the address indicated by the corresponding pointer 20$b$1.

The following will explain pointers 20b1 in the RAM 20b; the pointers are assigned to the interrupt factors, respectively.

With respect to each of interrupt factors, a pointer is used as a word to signify (i) a storage area specified by an address predetermined in the RAM 20b or (ii) an address value of a branch destination stored in the specified storage area in the RAM 20b. The onboard rewriting program 20c3 and the main program 20c2 are programmed previously such that an address value as a pointer 20b1 is written when either the onboard rewriting program 20c3 or the main program 20c2 is executed after the engine control computer 20 is activated.

For instance, execution of the onboard rewriting program 20c3 issues an instruction to write address values in storage areas of the RAM 20b corresponding to interrupt factors, respectively; the address values indicate start addresses of interrupt processing programs stored in the onboard rewriting program 20c3, which are executed according to the interrupt factors, respectively.

For example, suppose that an interrupt factor is a CAN reception. That is, when a signal is received via the in-vehicle LAN 60, the interrupt vector 20c1 refers to an address value of the pointer 20b1 corresponding to the CAN reception. When the onboard rewriting program 20c3 is being executed (under execution) at this time, the pointer 20b1 corresponding to the CAN reception is assigned with an address value which indicates a start address of a CAN reception interrupt processing program 20c31 in the onboard rewriting program 20c3. With reference to FIG. 2, the interrupt vector 20c1 refers to the address value of the pointer 20b1 and instructs the CPU 20a to branch to the start address of the CAN reception interrupt processing program 20c31 in the onboard rewriting program 20c3. Thereby, the CPU 20a starts execution of the CAN reception interrupt processing program 20c31 in the onboard rewriting program 20c3.

In contrast, when the main program 20c2 is executed, address values indicating addresses in the main program 20c2 are written in the storage areas of the RAM 20b corresponding to interrupt factors, respectively, by an instruction of the main program 20c2; the addresses in the main program 20c2 are addresses (i.e., CPU-accessed address) to which the CPU 20a should branches, respectively.

With reference to FIGS. 2, 3, in the present embodiment, the main program 20c2 contains user vectors 20c22 (also referred to a user vector table). The user vectors 20c22 store address values of start addresses for indicating the start addresses of interrupt processing programs, which are stored in the main program 20c2 and executed according to the interrupt factors, respectively. The user vectors 20c22 are stored in predetermined addresses in the rewriting area of the flash ROM 20c storing the main program 20c2, with respect to the interrupt factors, respectively.

As mentioned above, when writing an address value in the storage area serving as a pointer 20b1 corresponding to a subject interrupt factor, the main program 20c2 writes an address of a user vector 20c22 corresponding to the subject interrupt factor. This permits execution of the interrupt processing program 20c21 in the main program 20c2 corresponding to the subject interrupt factor via the user vector 20c22 when the subject interrupt factor arises. The user vector 20c22 is contained in the main program 20c2. Thus, when the address assignment of the interrupt processing program(s) 20c21 is changed at the time of the revision (of the version) of the main program 20c2, the contents of the user vector(s) 20c22 may be changed in conjunction with the change of the address assignment. Therefore, the engine control computer 20 permits the change of the address assignment of the interrupt processing program(s) as needed in the main program 20c2.

FIG. 3 illustrates a branch of processing when a CAN reception arises as an interrupt factor during execution of the main program 20c2. Since the main program 20c2 is executed, an address of a user vector 20c22 corresponding to a subject interrupt factor is written in a pointer 20b1 corresponding to the subject interrupt factor. Therefore, the processing by the CPU 20a once branches to a user vector 20c22 in an address corresponding to the CAN reception, and then branches to an address indicated by the user vector 20c22. Thereby, the CPU 20a is permitted to start execution of the CAN reception interrupt processing program 20c21 in the main program 20c2 when the CAN reception arises as an interrupt factor.

Thus, there is a subject pointer 20b1 assigned to an interrupt factor that is used in common by the onboard rewriting program 20c3 and the main program 20c2; an address value stored in the subject pointer 20b1 is rewritten each time the executed program is changed between the onboard rewriting program 20c3 and the main programs 20c2. Therefore, the subject pointer 20b1 is called a variable pointer.

In contrast, the onboard rewriting program 20c3 has limited functions as compared with the main program 20c2; the number of interrupt factors used for the onboard rewriting program 20c3 is generally smaller than that for the main program 20c2. That is, some of the interrupt factors are used for the main program 20c2 but not used for the onboard rewriting program 20c3. A target pointer 20b1 assigned to an interrupt factor that is used only for the main program 20c2 may indicate only an address of the user vector 20c22. Therefore, an address value of the target pointer 20b1 is fixed irrespective of the onboard rewriting program 20c3 or the main program 20c2, whichever is executed. The target pointer 20b1 may be referred to as a fixed pointer.

Figures 4, 5:
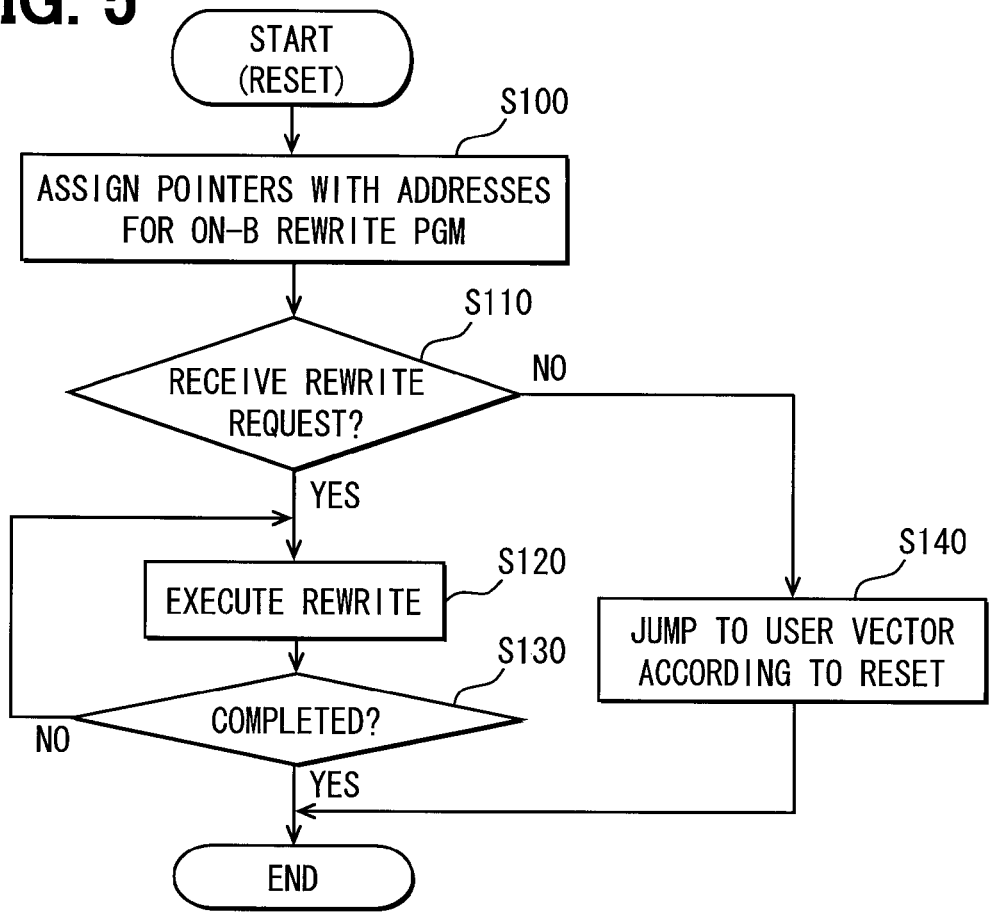
FIG. 4 is a diagram for explaining examples of assigning variable pointers and fixed pointers to interrupt factors.
FIG. 5 is a flowchart diagram illustrating a process by an engine control computer when a reset arises.

FIG. 4 illustrates examples of assigning a variable pointer and a fixed pointer to interrupt factors. Thus, when a fixed pointer is contained in the pointers 20b1 assigned to the interrupt factors, a fixed address value needs to be assigned to the fixed pointer also by the onboard rewriting program 20c3. This is one reason why the user vector 20c22 is used. The onboard rewriting program 20c3 is not changed after it is once written in the flash ROM 20c. A fixed address written in a fixed pointer by the onboard rewriting program 20c3 may specify a corresponding user vector 20c22. In this case, even when the address assignment of a subject interrupt processing program 20c21 actually executed is changed in the main program 20c2, the subject interrupt processing program 20c21 may be executed without any hindrance. Suppose that a start address of an interrupt processing program 20c21 may be specified directly with a variable pointer or fixed pointer, without using or transiting any user vector 20c22. In such a case, an address of the fixed pointer needs to be specified also by the onboard rewriting program 20c3. This disables the change of an address of a subject interrupt processing program corresponding to an interrupt factor used only by the main program 20c2, causing a restriction on generation of a program. Such a subject interrupt processing program may be an interrupt processing program resulting from an external signal input 1 (see FIG. 4), for instance.

Thus, the engine control computer 20 according to the present embodiment uses a variable pointer and an interrupt vector 20c1, thereby changing the address the CPU 20a accesses between (i) an address in the main program 20c2 (i.e., an address of a user vector 20c22) and (ii) an address in the onboard rewriting program 20c3, according to the main program 20c2 or onboard rewriting program 20c3, whichever is executed. This configuration permits indirect address specification using the interrupt vector 20c1 at the time of executing either the main program 20c2 or the onboard rewriting program 20c3, reducing a program size.

The following will explain a rewriting process of the main program 20c2. With reference to FIG. 1, a rewriting of the main program 20c2 is executed when (i) the program rewriting apparatus 10 is connected to the in-vehicle LAN 60 and (ii) the program rewriting apparatus 10 then outputs a rewriting request of the main program 20c2. This program rewriting apparatus 10 includes a CPU 10a, a memory 10b, and a communication portion 10c in order to instruct the CPU 20a in the engine control computer 20 to rewrite the flash ROM 20c.

Specifically, the CPU 10a of the program rewriting apparatus 10 outputs a rewriting request to the engine control computer 20 serving as a rewriting target via the communication portion 10c and the in-vehicle LAN 60. When the rewriting request is received by the engine control computer 20, the onboard rewriting program 20c3 starts execution of a rewriting process to write a rewriting program data transmitted from the program rewriting apparatus 10 in a rewriting area of the flash ROM 20c.

In the engine control computer 20 according to the present embodiment, an interrupt vector 20c1 is previously assigned with a start address of the onboard rewriting program 20c3 so as to permit the onboard rewriting program 20c3 to be executed when a reset arises as an interrupt factor. Thus, the onboard rewriting program 20c3 is started; thereby, the above-mentioned process of the writing of the address values to the pointers 20b1 becomes executable by the onboard rewriting program 20c3. When any rewriting request of the main program 20c2 is not determined at the time of execution of the onboard rewriting program 20c3, a user vector 20c22 in an address corresponding to the reset is indicated, as a branch destination address, by the onboard rewriting program 20c3. This user vector 20c22 describes branching to the start address of the main program 20c2. Therefore, the main program 20c2 is started; then, the process of the writing of the address values to the pointers 20b1 becomes executable by the main program 20c2.

With reference to FIG. 5, the following will explain a process by the engine control computer 20 when a reset arises. It is further noted that a flowchart in the present application includes sections (also referred to as steps), which are represented, for instance, as S100. Further, each section can be divided into several sections while several sections can be combined into a single section. Furthermore, each of thus configured sections can be referred to as a module, device, or means and achieved not only (i) as a software section in combination with a hardware unit (e.g., computer), but also (ii) as a hardware section, including or not including a function of a related apparatus. Further, the hardware section may be inside of a microcomputer. Now, a reset arises, starting an execution of the onboard rewriting program 20c3. At S100, start addresses of storage areas storing interrupt processing programs in the onboard rewriting program 20c3 are assigned to pointers 20b1 corresponding to interrupt factors, respectively. Thereby, when a subject interrupt factor within the interrupt factors occurs during execution of the onboard rewriting program 20c3, an interrupt processing program corresponding to the subject interrupt factor in the onboard rewriting program 20c3 may be executed.

At S110, it is determined whether a rewriting request of the main program 20c2 is received from the program rewriting apparatus 10. That is, when the program rewriting apparatus 10 is connected to the in-vehicle LAN 60 and a rewriting request is then outputted by an operator's manipulation from the program rewriting apparatus 10, the engine control computer 20 receives the rewriting request, affirming the determination at S110 (S110: Yes). In contrast, when the program rewriting apparatus 10 is not connected to the in-vehicle LAN 60 within a predetermined time period, the determination at S110 is negated (S110: No).

When the determination at S110 is affirmed, the flow proceeds to S120, where the rewriting process is executed. In the rewriting process at S120, multiple main program data, which are prepared by division of a source data, are transmitted from the program rewriting apparatus 10 and written in the rewriting area of the flash ROM 20c in order. When it is determined at S130 that all the data are written, the process in FIG. 5 ends. When the determination at S110 is negated (S110: No), the flow proceeds to S140, where the processing branches via the user vector 20c22 to the start address of the main program 20c2, starting the execution of the main program 20c2. Then, start addresses of storage areas of interrupt processing programs stored in the main program 20c2 are assigned to pointers 20b1 corresponding to interrupt factors, respectively. Thereby, when a subject interrupt factor within the interrupt factors occurs during execution of the main program 20c2, the interrupt processing program corresponding to the subject interrupt factor in the main program 20c2 is executed. In addition, the execution of the main program 20c2 starts an engine control process.

Thus, the pointer 20b1 along with the main program 20c2 and the onboard rewriting program 20c3 may function as a change section or means that uses the address indicated by the interrupt vector 20c1 and changes a CPU-accessed address, which is an address accessed by the CPU, into either an address within the main program 20c2 or an address within the onboard rewriting program 20c3 according to the main program 20c2 or the onboard rewriting program 20c3, whichever is executed. Further, the change section may specify the predetermined address storing the user vector 20c22 when changing the CPU-accessed address into the address within the main program 20c2.

Second Embodiment

The following will explain an engine control computer according to a second embodiment of the present disclosure. The engine control computer 20 of the second embodiment has the same configuration as that of the first embodiment; the explanation about the configuration is omitted.

In the engine control computer 20 according to the first embodiment, when one of the interrupt factors arises, an interrupt vector 20c1 refers to a pointer 20b1 rewritten by the main program or the onboard rewriting program, and provides the CPU 20a with an address (i.e., a CPU-accessed address) of a branch destination.

The present embodiment does not use those pointers 20b1 in the first embodiment. Instead, the present embodiment is provided with an interrupt changeover program in a non-rewriting area of the flash ROM 20c. Thus, the pointers 20b1 provided in the RAM 20b are not used. This configuration can prevent certainly the processing of the CPU 20a from branching to an unexpected branch destination because of corruption of the RAM, for example.

The following will explain an interrupt changeover program with reference to FIGS. 6 to 10. In the microcomputer 20 according to the present embodiment, when one of the interrupt factors occurs, the processing of the CPU 20a branches to a start address of the interrupt changeover program 20c4 using the interrupt vector 20c1, executing the interrupt changeover program 20c4.

Figure 6:
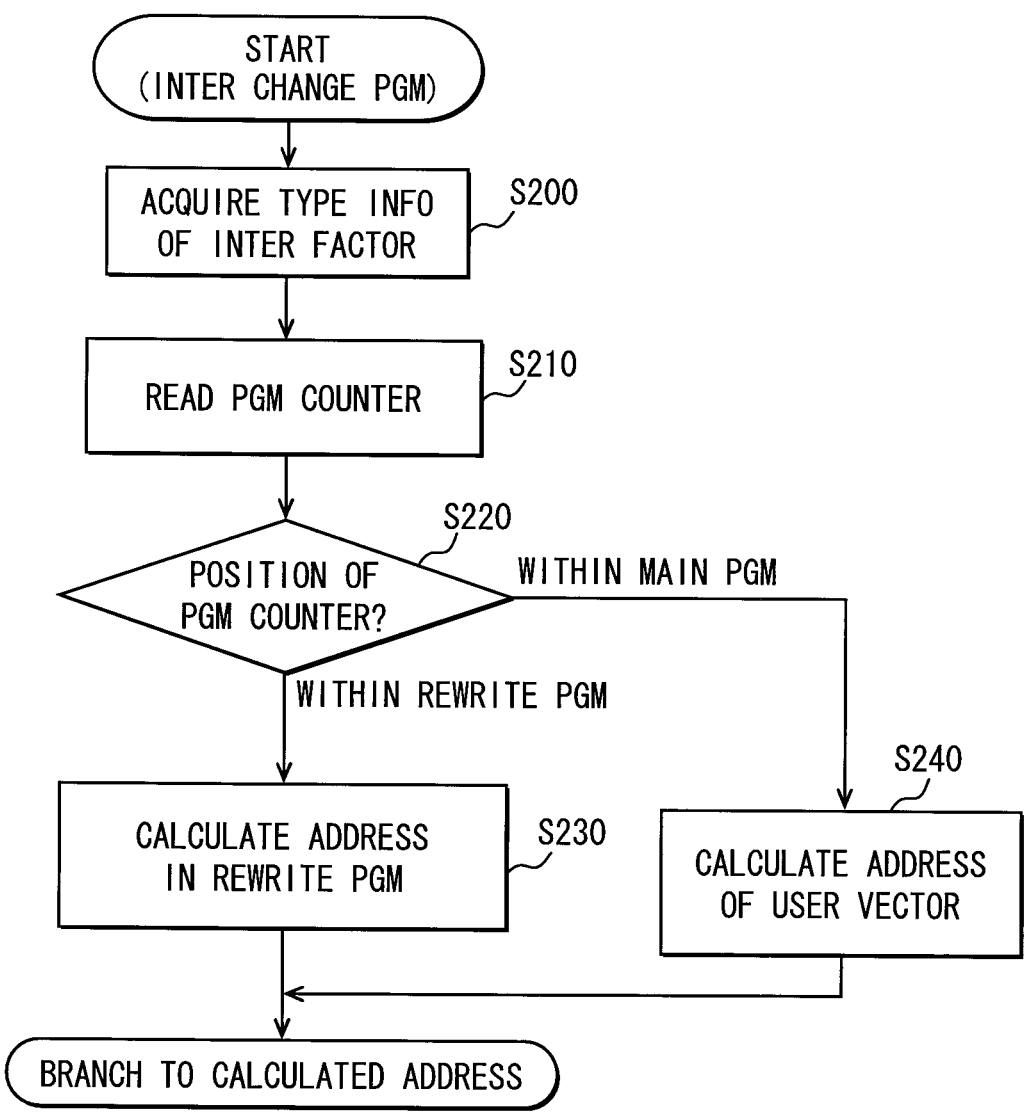
FIG. 6 is a flowchart diagram illustrating a process of an interrupt changeover program according to a second embodiment of the present disclosure.

FIG. 6 illustrates a flowchart of a process by the interrupt changeover program. First, at S200, an exception code of a subject interrupt factor that occurs is acquired.

With reference to FIG. 9, a specific exception code is assigned to each of different types of interrupt factors. Therefore, the type of the subject interrupt factor having occurred can be specified from these different exception codes. When the subject interrupt factor occurs, the exception code corresponding to the subject interrupt factor is stored in a register inside the computer.

Therefore, at S200, an exception code indicating the type of the subject interrupt factor having occurred is read and acquired from the register inside the computer.

At S210, the value of a program counter (PC) when the subject interrupt factor has occurred is read and acquired. The program counter indicates an address of a program which the CPU 20a processes before the subject interrupt factor occurs. This value of the program counter enables determination as to whether before the occurrence of the subject interrupt factor, the CPU 20a was executing the main program 20c2 or executing the onboard rewriting program 20c3.

Thus, at S220, it is determined whether the position of the program counter indicates that the executed program is within the main program or indicates that the executed program is within the onboard rewriting program. When it is determined that the executed program is within the onboard rewriting program, the flow proceeds to S230. At S230, a start address is calculated; the start address is of the storage area of the interrupt processing program, which is executed according to the subject interrupt factor having occurred, within the onboard rewriting program. However, when the subject interrupt factor having occurred is not used in the onboard rewriting program, the interrupt changeover program 20c4 is programmed to calculate an address of a user vector 20c22 corresponding to the subject interrupt factor.

In contrast, when it is determined that the executed program is within the main program, the flow proceeds to S240. At S240, an address of a user vector 20c22 according to the subject interrupt factor having occurred is calculated.

With reference to FIGS. 9, 10, a user vector 20c22 is a map of an interrupt vector in respect of a type or assignment order of an interrupt factor. For instance, the addition result obtained by adding an exception code to the start address (00010000H) of the user vectors 20c22 (i.e., user vector table) becomes an address of a user vector 20c22 corresponding to an interrupt factor. Therefore, the address of the user vector 20c22 to which the processing should branch is obtained by adding the start address of the user vector 20c22 to the exception code.

Figure 7:
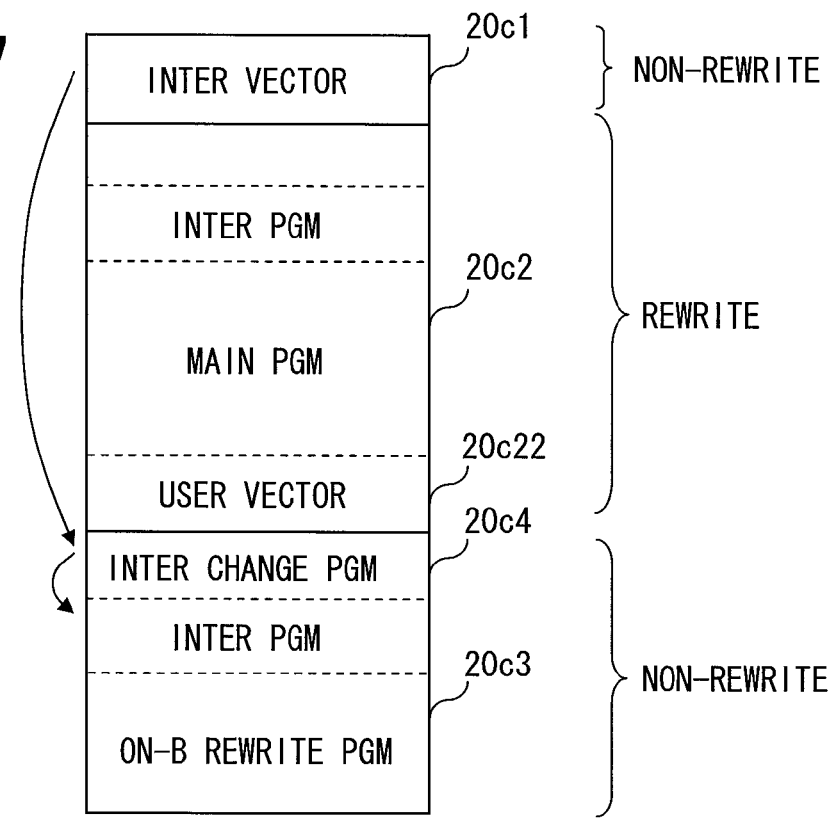
FIG. 7 is a diagram for explaining a branch of processing when an interrupt factor arises during execution of an onboard rewriting program.

FIG. 7 illustrates a branch of the processing when a subject interrupt factor occurs during execution of the onboard rewriting program 20c3. Since the onboard rewriting program 20c3 is executed at this time, the interrupt changeover program 20c4 calculates a start address of a storage area of an the interrupt processing program, which is executed according to the subject interrupt factor having occurred, within the onboard rewriting program. Then, the processing by the CPU 20a branches to the calculated address and starts the execution of the interrupt processing program within the onboard rewriting program 20c3.

Figure 8:
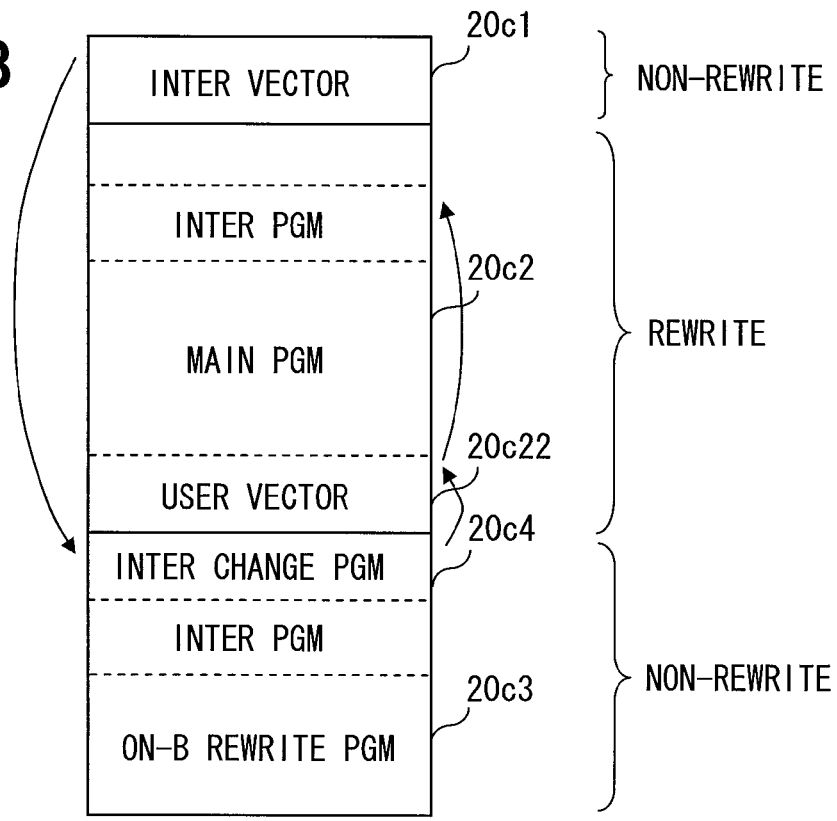
FIG. 8 is a diagram for explaining a branch of processing when an interrupt factor arises during execution of a main program.

FIG. 8 illustrates a branch of the processing when a subject interrupt factor occurs during execution of the main program 20c2. Since the main program 20c2 is executed, the interrupt changeover program 20c4 calculates an address of a user vector 20c22 corresponding to the subject interrupt factor having occurred. Then, the processing by the CPU 20a moves to the user vector 20c22 at the calculated address. The user vectors 20c22 describe start addresses of interrupt processing programs which should be executed to interrupt factors, respectively, for instance. This permits execution of the interrupt processing program 20c21 in the main program 20c2 corresponding to the subject interrupt factor via the user vector 20c22, similarly to the first embodiment.

It is noted that, when a reset occurs as an interrupt factor, the interrupt processing program calculates a start address of the onboard rewriting program so as to execute the onboard rewriting program. Thus, the onboard rewriting program 20c3 indicates the start address of the user vectors 20c22 as a branch destination address when any rewriting request of the main program 20c2 is not determined during the execution of the onboard rewriting program 20c3. The user vector 20c22 of the start address describes branching to the start address of the main program. Therefore, the execution of the main program 20c2 may be started via the user vector 20c22.

In addition, when a reset occurs as an interrupt factor, the branching may be made directly from the interrupt vector to the onboard rewriting program, without passing through the interrupt processing program.

Thus, the interrupt changeover program 20c4 along with the main program 20c2 and the onboard rewriting program 20c3 may function as a change section or means that uses the address indicated by the interrupt vector 20c1 and changes a CPU-accessed address, which is an address accessed by the CPU, into either an address within the main program 20c2 or an address within the onboard rewriting program 20c3 according to the main program 20c2 or the onboard rewriting program 20c3, whichever is executed. Further, the change section may specify the predetermined address storing the user vector 20c22 when changing the CPU-accessed address into the address within the main program 20c2.

While the present disclosure has been described with reference to preferred embodiments thereof, it is to be understood that the disclosure is not limited to the preferred embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. A microcomputer comprising:
   a CPU that executes selectively (i) a main program and (ii) an onboard rewriting program that executes an onboard rewriting of the main program; and
   a nonvolatile memory that includes (i) a rewriting permitted area where data are enabled to be rewritten and (ii) a rewriting forbidden area where data are forbidden from being rewritten,
   the rewriting permitted area storing the main program,
   the rewriting forbidden area storing the onboard rewriting program, the rewriting forbidden area further storing an interrupt vector with respect to each of a plurality of interrupt factors, the interrupt factors being different from each other, the interrupt vector indicating an address of a branch destination when each of the plurality of interrupt factors arises, the microcomputer further comprising:

a change section that uses the address indicated by the interrupt vector and changes a CPU-accessed address, which is an address accessed by the CPU, into either an address within the main program or an address within the onboard rewriting program according to the main program or the onboard rewriting program, whichever is executed, wherein:

the main program includes a user vector stored in a predetermined address that is predetermined with respect to each of the plurality of interrupt factors, the user vector indicating an address which stores an interrupt processing program that is executed when each of the plurality of interrupt factors arises;

the change section specifies the predetermined address storing the user vector when changing the CPU-accessed address into the address within the main program;

the change section includes a variable pointer,
the variable pointer being rewritten into a predetermined address storing a user vector with respect to a subject interrupt factor that is one of the plurality of interrupt factors by an instruction of the main program when the main program is executed, the variable pointer being rewritten into an address within the onboard rewriting program storing an interrupt processing program that is executed when the subject interrupt factor arises by an instruction of the onboard rewriting program when the onboard rewriting program is executed; and the interrupt vector
refers to the variable pointer with respect to the subject interrupt factor arising, and
provides the CPU-accessed address.

2. The microcomputer according to claim 1, wherein:
the variable pointer is assigned to the subject interrupt factor that is used in common by the main program and the onboard rewriting program; and
the change section further includes a fixed pointer, which is assigned to a target interrupt factor that is one of the plurality of interrupt factors used only by the main program so as to indicate a predetermined address storing a user vector with respect to the target interrupt factor, regardless of whether the main program or onboard rewriting program is executed.

3. The microcomputer according to claim 1, wherein:
the interrupt vector is assigned with a start address of the onboard rewriting program so that the onboard rewriting program is executed first when a reset arises as one of the plurality of interrupt factors;
an execution of the onboard rewriting program is thereby started when the reset arises; and
when a rewriting request of the main program is not determined during the execution of the onboard rewriting program, the onboard rewriting program branches processing by the CPU to the main program to start an execution of the main program.

4. A microcomputer comprising:
a CPU that executes selectively (i) a main program and (ii) an onboard rewriting program that executes an onboard rewriting of the main program; and
a nonvolatile memory that includes (i) a rewriting permitted area where data are enabled to be rewritten and (ii) a rewriting forbidden area where data are forbidden from being rewritten,
the rewriting permitted area storing the main program,
the rewriting forbidden area storing the onboard rewriting program,
the rewriting forbidden area further storing an interrupt vector with respect to each of a plurality of interrupt factors, the interrupt factors being different from each other,
the interrupt vector indicating an address of a branch destination when each of the plurality of interrupt factors arises,
the microcomputer further comprising:
a change section that uses the address indicated by the interrupt vector and changes a CPU-accessed address, which is an address accessed by the CPU, into either an address within the main program or an address within the onboard rewriting program according to the main program or the onboard rewriting program, whichever is executed,
wherein:
the main program includes a user vector stored in a predetermined address that is predetermined with respect to each of the plurality of interrupt factors, the user vector indicating an address which stores an interrupt processing program that is executed when each of the plurality of interrupt factors arises;
the change section specifies the predetermined address storing the user vector when changing the CPU-accessed address into the address within the main program;
the change section includes an interrupt changeover program stored in the rewriting forbidden area of the nonvolatile memory;
when one of the plurality of interrupt factors arises, the interrupt vector instructs the CPU to execute the interrupt changeover program;
the interrupt changeover program, which is executed, (i) determines whether the main program or the onboard rewriting program was executed from a position of a program counter when the one of the plurality of interrupt factors arises and (ii) acquires type information of the one of the plurality of interrupt factors arising, the type information specifying one of a plurality of types in which the interrupt factors are different from each other;
the interrupt changeover program calculates as the CPU-accessed address an address which stores the user vector with respect to an interrupt factor that is one of the plurality of interrupt factors corresponding to the acquired type information when the main program was executed; and
the interrupt changeover program calculates as the CPU-accessed address an address within the onboard rewriting program storing an interrupt processing program, which is executed when the interrupt factor corresponding the acquired type information arises, when the onboard rewriting program was executed.

5. The microcomputer according to claim 4, wherein:
with respect to a subject interruption factor that is used in common by the main program and the onboard rewriting program, the interrupt changeover program calculates either an address storing the user vector in the main program or an address within the onboard rewriting program according to either the main program or onboard rewriting program, whichever is executed; and with respect to a target interruption factor that is used only by the main program, the interrupt changeover program calculates an address storing the user vector in the main program, regardless of whether the main program or onboard rewriting program is executed.

6. The microcomputer according to claim 4, wherein:

when a reset arises as one of the plurality of interrupt factors, processing by the CPU branches to the onboard rewriting program by the interrupt vector or the interrupt changeover program, and an execution of the onboard rewriting program is started; and when a rewriting request of the main program is not determined during the execution of the onboard rewriting program, processing by the CPU branches to the main program by the onboard rewriting program, and an execution of the main program is started.

* * * * *